United States Patent
Kato et al.

(10) Patent No.: US 7,738,034 B2
(45) Date of Patent: Jun. 15, 2010

(54) IMAGE PROCESSING APPARATUS WITH ILLUMINATION UNIT AND IMAGING UNIT IN DIFFERENT CASINGS

(75) Inventors: Yutaka Kato, Kyoto (JP); Yuji Suzuki, Kyoto (JP)

(73) Assignee: Omron Corporation, Kyoto-shi (JP)

( * ) Notice: Subject to any disclaimer, the term of this patent is extended or adjusted under 35 U.S.C. 154(b) by 672 days.

(21) Appl. No.: 11/635,765

(22) Filed: Dec. 8, 2006

(65) Prior Publication Data

US 2007/0139549 A1 Jun. 21, 2007

(30) Foreign Application Priority Data

Dec. 15, 2005 (JP) .............................. 2005-361610

(51) Int. Cl.
H04N 5/225 (2006.01)
(52) U.S. Cl. ...................................... 348/370; 348/131
(58) Field of Classification Search ............ 348/211.14, 348/370, 371, 131, 132, 269, E5.029, E5.038
See application file for complete search history.

(56) References Cited

U.S. PATENT DOCUMENTS

| | | | | |
|---|---|---|---|---|
| 5,920,342 A | * | 7/1999 | Umeda et al. | 348/211.14 |
| 6,160,582 A | * | 12/2000 | Hill | 348/370 |
| 6,219,093 B1 | * | 4/2001 | Perry | 348/E5.038 |
| 6,437,824 B1 | * | 8/2002 | Suzuki et al. | 348/222.1 |
| 7,002,624 B1 | | 2/2006 | Uchino et al. | |
| 2001/0050719 A1 | | 12/2001 | Kobayashi et al. | |
| 2003/0030725 A1 | * | 2/2003 | Broemmelsiek et al. | 348/372 |
| 2003/0214581 A1 | * | 11/2003 | Ikami | 348/131 |
| 2005/0174445 A1 | * | 8/2005 | Yamashina | 348/231.7 |
| 2005/0265014 A1 | | 12/2005 | Matsui et al. | |

FOREIGN PATENT DOCUMENTS

JP 2001-078202 3/2001

OTHER PUBLICATIONS

"Specifications of the Camera Link Interface Standard for Digital Cameras and Frame Grabbers," Camera Link, Oct. 2000, 34 Sheets.

* cited by examiner

Primary Examiner—Jason Whipkey
(74) Attorney, Agent, or Firm—Foley & Lardner LLP

(57) ABSTRACT

A control unit converts image information into differential signals to transmit to a controller. The control unit receives control signals (differential signals) for controlling a lens unit or an illumination unit, to control the lens unit or the illumination unit. Only a signal cable is used for being connected between an imaging device and the controller to remotely control the lens unit or the illumination unit from the controller. Therefore, compact wiring can be realized between the controller and the imaging device.

5 Claims, 7 Drawing Sheets

Fig. 10 PRIOR ART
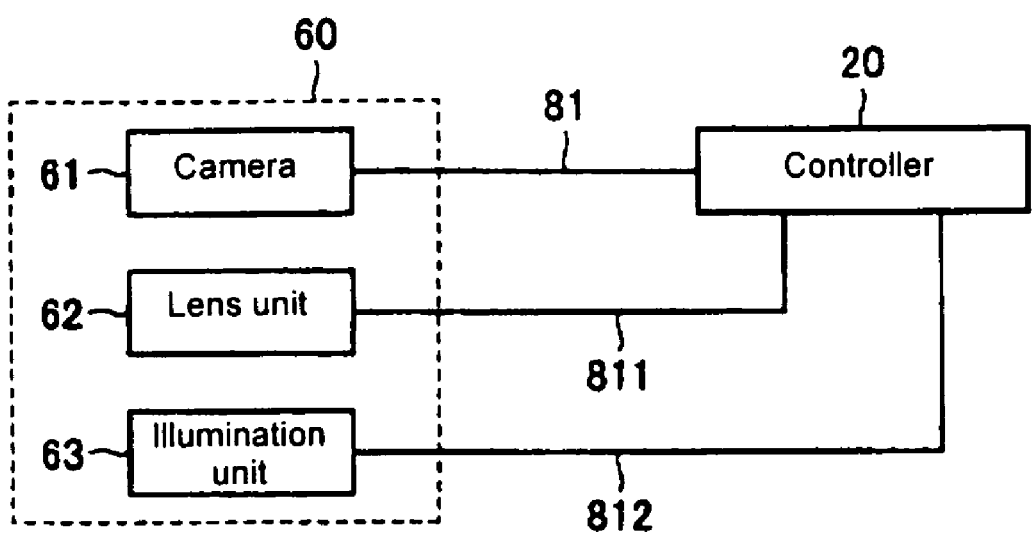

IMAGE PROCESSING APPARATUS WITH ILLUMINATION UNIT AND IMAGING UNIT IN DIFFERENT CASINGS

BACKGROUND OF THE INVENTION

This application claims priority from Japanese patent application 2005-361610, filed on Dec. 15, 2005. The entire content of the aforementioned application is incorporated herein by reference.

1. Field of the Invention

The present invention relates to an image processing apparatus, and particularly to the image processing apparatus equipped with an industrial digital camera and a processing device for processing image data obtained from the camera.

2. Description of the related art

Conventionally, there are well known standards such as RS-644 and RS-422 for image data transmission from an FA (Factory Automation) digital camera (hereinafter also simply referred to as "camera") to a processing device (for example, an image input board mounted on a personal computer). In the standards, although the image data transmission method is defined, a cable and a connector which are used to connect the camera and the processing device, pin arrangement of the connector, and the like are not defined. Therefore, camera manufacturers and image input board manufacturers have produced products according to formats independently defined by the manufacturers, which causes a user to take a lot of troubles for connection between the products which are not compatible with each other.

In order to eliminate the inconvenience, a standard called "camera link" is established (for example, see "Specifications of the Camera Link Interface Standard for Digital Cameras and Frame Grabbers", [online], October 2000, [Dec. 2, 2005], Internet <URL:http://www.pulnix.com/CameraLink/CameraLink5.pdf>). The connector format, the connector pin arrangement, cable specifications, a communication method, and the like are defined in the camera link standard. That is, the products pursuant to the camera link standard are compatible with one another.

In many cases, a lens (for example, lens with a motor-driven zoom function) is connected to the camera. In a case of the FA camera, an illumination device which illuminates a subject (for example, a product on a production line) is sometimes simultaneously used with the camera. Conventionally, the lens and illumination device can remotely be controlled. A problem with the conventional image processing apparatus will be described below with reference to the drawings.

FIG. 10 shows a configuration example of the conventional image processing apparatus. Referring to FIG. 10, an image processing apparatus 800 includes a controller 20 and an imaging device 60. The imaging device 60 includes a camera 61, a lens unit 62, and an illumination unit 63. Signal cables 81, 811, and 812 which transmit control signals from the controller 20 are provided correspondingly to each of the camera 61, the lens unit 62, and the illumination unit 63.

Thus, in the conventional image processing apparatus (particularly, in the image processing apparatus equipped with the FA camera), the signal cables are required to connect the controller and each of the camera, the lens unit, and the illumination unit. Therefore, in the conventional image processing apparatus, due to the large number of wirings, there is a problem that signal line routing and wire connection become complicated.

Control to the camera 61 from the controller 20 and the image data transmission from the camera 61 to the controller 20 are regulated in the above camera link standard. However, in the camera link standard, there is no clear regulation about control to the lens unit 62 and illumination unit 63 from the controller 20. Therefore, even if a cable pursuant to the camera link standard is used as the signal cable 81, the signal cables 811 and 812 are required to control the lens unit 62 and illumination unit 63 from the controller 20.

An object of the present invention is to provide an image processing apparatus which can remotely control the lens unit and illumination unit simultaneously used with the FA camera, through compact wiring.

SUMMARY OF THE INVENTION

The present invention briefly provides an image processing apparatus including an imaging device. The imaging device includes an illumination unit, an imaging unit, and a control unit, the imaging unit taking an image of a subject, the control unit controlling the illumination unit by receiving a differential control signal for controlling the illumination unit and converting image information obtained by the imaging unit into a differential image signal to output the differential image signal. The image processing apparatus further includes a main body unit and a single signal cable. The main body unit receives the differential image signal from the control unit to perform a predetermined process, and converts a control command for controlling the illumination unit into the differential control signal to output the differential control signal. The single signal cable transmits the differential image signal and the differential control signal, wherein the signal cable includes a signal line pair for transmitting the differential image signal from the control unit to the main body unit and a signal line pair for transmitting the differential control signal from the main body unit to the control unit.

Preferably, the illumination unit and the imaging unit are accommodated in different casings from each other. The control unit converts the differential control signal into the control command. The control unit controls the imaging unit based on the control command when the control command indicates control to the imaging unit, and generates an instruction signal according to the control command to transmit to the illumination unit when the control command indicates control to the illumination unit. The illumination unit includes a motion control unit which controls motion of the illumination unit according to the instruction signal.

The present invention according to another aspect provides an image processing apparatus including an imaging device which includes a lens unit, an imaging unit, and a control unit. The lens unit has at least one of a zoom function, a focal distance conversion function, and an aperture function. The imaging unit takes an image of a subject through the lens unit. The control unit receives a differential control signal for controlling the lens unit, controls at least the one of the zoom function, the focal distance conversion function, and the aperture function which are possessed by the lens unit, and converts image information obtained by the imaging unit into a differential image signal to output the differential image signal. The image processing apparatus further includes a main body unit and a single signal cable. The main body unit receives the differential image signal from the control unit to perform a predetermined process, and converts a control command for controlling the lens unit into a differential control signal to output the differential control signal. The signal cable transmits the differential image signal and the differential control signal, wherein the signal cable includes a signal line pair for transmitting the differential image signal from the control unit to the main body unit and a signal line pair for transmitting the differential control signal from the main body unit to the control unit.

Preferably, the lens unit and the imaging unit are accommodated in different casings from each other. The control unit converts the differential control signal into the control command. The control unit controls the imaging unit based on the control command when the control command indicates control to the imaging unit, and generates an instruction signal according to the control command to transmit to the lens unit when the control command indicates control to the lens unit. The lens unit includes a motion control unit which controls motion of the lens unit according to the instruction signal.

More preferably, the signal cable is pursuant to a camera link standard. Further preferably, the subject is a product conveyed on a manufacturing floor.

According to the image processing apparatus of the present invention, remote control from the main body unit to the lens unit and the illumination unit can be realized using compact wiring.

BRIEF DESCRIPTION OF THE DRAWINGS

FIG. 10 shows a configuration example of a conventional image processing apparatus.

DETAILED DESCRIPTION OF THE PREFERRED EMBODIMENTS

Embodiments of the present invention will be described in detail below with reference to the drawings. In the following drawings, the same numeral designates the same or corresponding component.

Figure 1:
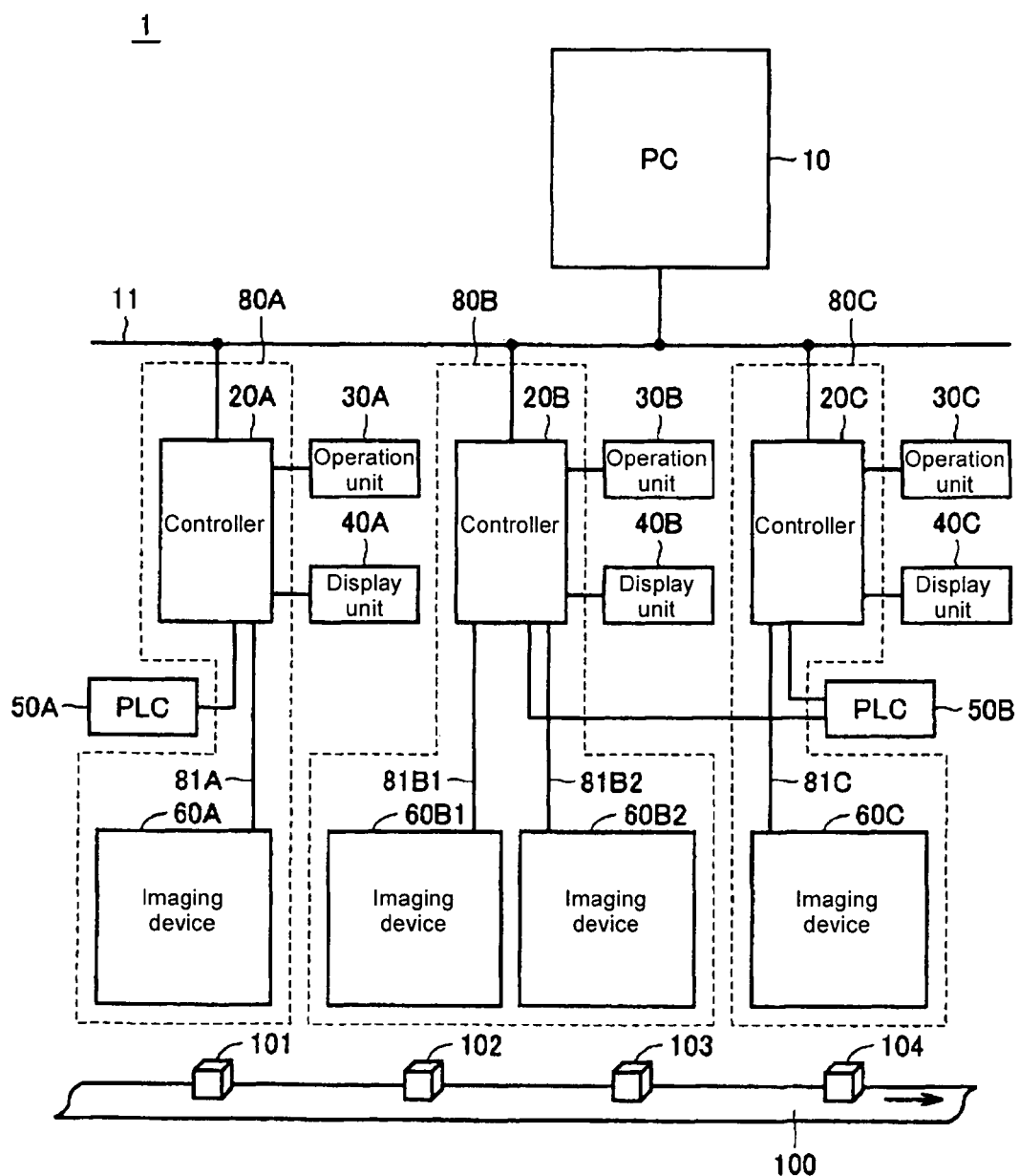
FIG. 1 shows an application example of an image processing apparatus according to an embodiment.

FIG. 1 shows an application example of an image processing apparatus according to an embodiment. Referring to FIG. 1, a sensor system 1 is used to inspect products 101 to 104 conveyed on a manufacturing floor such as a production line 100. The products 101 to 104 are completed products or semi-finished products.

The sensor system 1 includes a PC (personal computer) 10, a network line 11, operation units 30A to 30C, display units 40A to 40C, PLCs (programmable controller) 50A and 50B, and image processing apparatuses 80A to 80C. Each of the image processing apparatuses 80A to 80C corresponds to the image processing apparatus of the present embodiment.

The PC 10 transmits and receives information to and from the image processing apparatuses 80A to 80C through the network line 11. For example, the network line 11 is a line for LAN (Local Area Network). An operator can use the PC 10 to monitor a running status of the production line 100 or to remotely operate the image processing apparatuses 80A to 80C.

In FIG. 1, the image processing apparatus 80A takes an image of the product 101. Similarly the image processing apparatus 80B takes images of the product 102 and 103, and the image processing apparatus 80C takes a image of the product 104. Each of the image processing apparatuses compares a previously stored image pattern (image information) and information on the taken image to output a comparison result.

The PLC 50A receives the comparison result from the image processing apparatus 80A. The PLC 50B receives the comparison results from the image processing apparatuses 80B and 80C. When an irregular color or a flaw is found in the product, the comparison result from each of the image processing apparatuses indicates that the stored image information is not in agreement with the taken image information. The PLCs 50A and 50B determine whether the products 101 to 104 are proceeded to a next production process or the products 101 to 104 are discharged from the production line 100 based on the comparison result.

Each of the image processing apparatuses 80A to 80C includes a controller and an imaging device. The controller corresponds to "a main body unit" in the image processing apparatus of the present invention. In FIG. 1, the image processing apparatus 80A includes a controller 20A and an imaging device 60A. The image processing apparatus 80B includes a controller 20B and imaging devices 60B1 and 60B2. The image processing apparatus 80C includes a controller 20C and an imaging device 60C. In the image processing apparatus of the present embodiment, as in the image processing apparatus 80B, plural imaging devices (imaging devices 60B1 and 60B2) may be provided in one controller (controller 20B). Each of the controllers 20A to 20C is connected to the network line 11.

Each of the image processing apparatuses 80A to 80C further includes a signal cable for transmitting a signal between the controller and the imaging device. The image processing apparatus 80A further includes a signal cable 81A. Similarly, the image processing apparatus 80B further includes signal cables 81 B1 and 81 B2, and the image processing apparatus 80C further includes a signal cable 81C. The configuration of the signal cable will be described later.

The operation units 30A to 30C are connected to the controllers 20A to 20C respectively. Similarly the display units 40A to 40C are connected to the controllers 20A to 20C respectively. For example, the operation units 30A to 30C are mouses or keyboards. For example, the display units 40A to 40C are liquid crystal displays. A user performs setting of the imaging device using the display unit and the operation unit. Information on the setting of the imaging device is transmitted from the controller to the imaging device through the signal cable. The imaging device changes zoom magnification of a lens or shutter speed according to the information.

Configurations of the image processing apparatuses 80A to 80C will be described below. The controllers 20A to 20C have the same configuration. The imaging devices 60A, 60B1, 60B2, and 60C have the same configuration. The signal cables 81A, 81B1, 81B2, and 81C have the same configuration. Therefore, in the following description, the controllers 20A to 20C are collectively called "controller 20", the imaging devices 60A, 60B1, 60B2, and 60C are collectively called "imaging device 60", and the signal cables 81A, 81B1, 81B2, and 81C are collectively called "signal cable 81".

Figure 2:
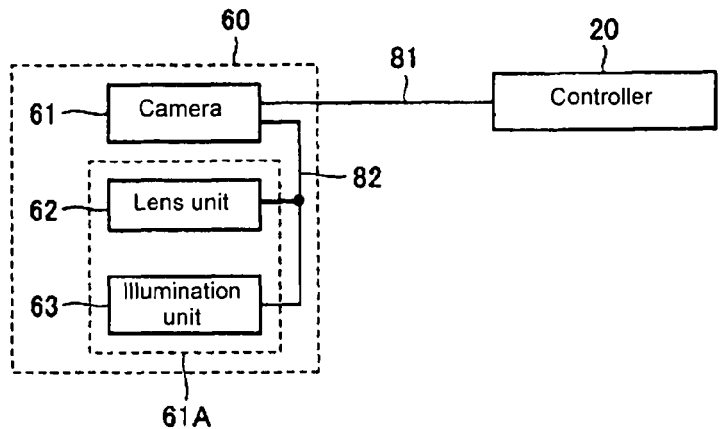
FIG. 2 shows a schematic configuration of an imaging device 60.

FIG. 2 shows a schematic configuration of the imaging device 60. Referring to FIG. 2, the imaging device 60 includes a camera 61, an auxiliary unit 61A, and a signal cable 82. The auxiliary unit 61A has a lens unit 62 and an illumination unit 63. The camera 61 is a device which takes an image of the product (subject) shown in FIG. 1 through the lens unit 62.

The lens unit 62 has at least one of a zoom function, a focal distance conversion function, and an aperture function. The illumination unit 63 illuminates the subject with light.

The controller 20 transmits a control signal to the camera 61 through the signal cable 81 to control the lens unit 62 and the illumination unit 63. In a case where the received control signal is a signal for controlling the lens unit 62 or the illumination unit 63, the camera 61 transmits an instruction signal through the signal cable 82 to the lens unit 62 or the illumination unit 63. The lens unit 62 or the illumination unit 63 operates according to the received instruction signal. In the conventional example shown in FIG. 10, because the controller 20 controls the lens unit 62 and the illumination unit 63, the signal cables 811 and 812 are required for the lens unit 62 and the illumination unit 63 respectively. In the image processing apparatus 80, only the signal cable 81 is connected to the controller 20. Therefore, according to the present embodiment, the lens unit and illumination unit simultaneously used with the FA camera can remotely be controlled through compact wiring.

The camera 61 also receives a control signal concerning control of itself from the controller 20. In this case, the camera 61 changes the shutter speed or the like based on the received control signal.

Alternatively, in place of the use of the signal cable 82 shown in FIG. 2, the camera 61 and the auxiliary unit 61A may directly be connected with a male connector and a female connector.

Figure 3:
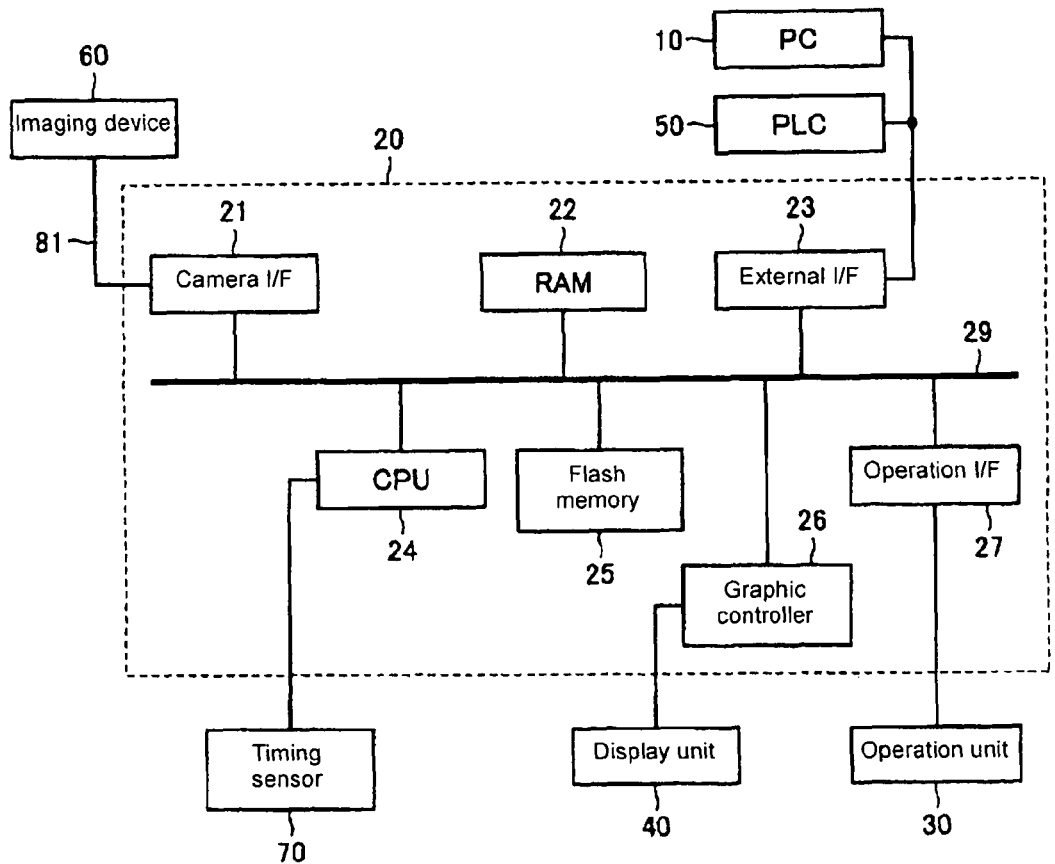
FIG. 3 shows a configuration of a controller 20 of FIG. 2.

FIG. 3 shows a configuration of the controller 20 of FIG. 2. Referring to FIG. 3, the controller 20 includes a camera I/F (interface) 21, a RAM (volatile memory) 22, an external I/F 23, a CPU (central processing unit) 24, a flash memory 25, a graphic controller 26, an operation I/F 27, and an internal bus 29.

A timing sensor 70 (not shown in FIG. 1) is an optical sensor which is installed on the production line 100 of FIG. 1. When a product passes through an place of the timing sensor 70 being installed, the timing sensor 70 transmits a timing signal to the CPU 24.

The CPU 24 outputs an imaging instruction to the imaging device 60 according to the received timing signal. The CPU 24 performs a predetermined process according to image information received from the imaging device 60. The CPU 24 also controls the whole operation of the controller 20.

The camera I/F 21 is a circuit which performs communication with the imaging device 60 in the controller 20,. The image information received by the camera I/F 21 is temporarily stored in the RAM 22, and data necessary for various processes performed by the CPU 24 is temporarily stored in RAM 22. Programs executed by the CPU 25 and parameters which should be stored are stored in a non-volatile manner in the flash memory 25. The graphic controller 26 outputs image information to the display unit 40 in order to display image information from the imaging device 60 and image information already processed by the CPU 24. The external I/F 23 provides the CPU 24 with information inputted from the PC 10 or the PLC 50. The operation I/F 27 is connected to the operation unit 30, and receives information outputted from the operation unit 30 according to the user operation. The information is transmitted from the operation I/F 27 to the CPU 24. In the controller 20, these pieces of information are transmitted through the internal bus 29.

Figure 4:
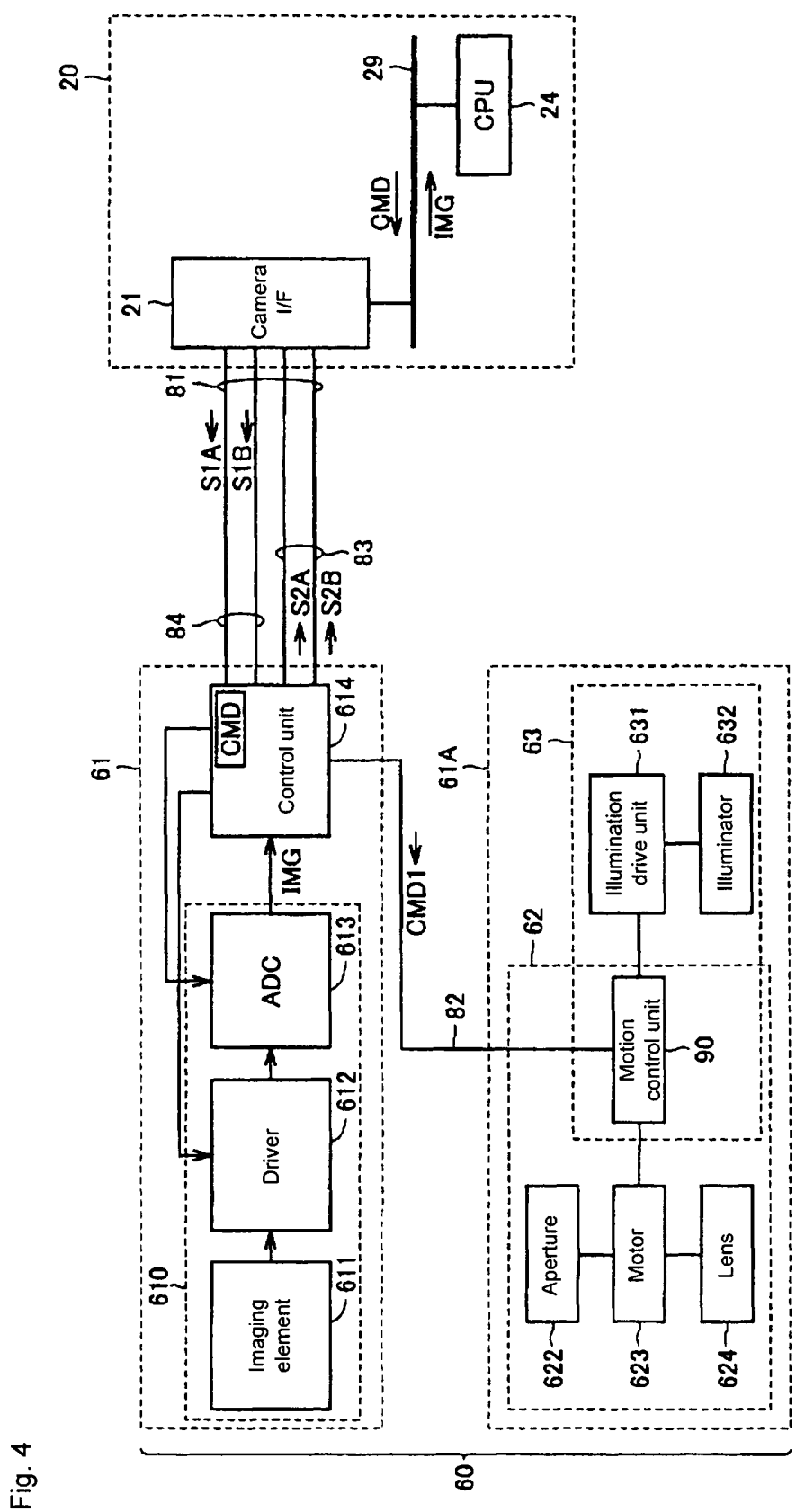
FIG. 4 shows a detailed configuration of a camera 61 and an auxiliary unit 61A of FIG. 2.

FIG. 4 shows a detailed configuration of the camera 61 and the auxiliary unit 61A of FIG. 2. Referring to FIG. 4, the camera 61 includes an imaging unit 610 which takes an image of the subject (products 101 to 104 of FIG. 1). The imaging unit 610 includes an imaging element 611, a driver 612, and a ADC (A/D Converter) 613.

The imaging element 611 may be a CCD (charge coupled device) and a CMOS (complementary mental-oxide semiconductor device) sensor including plural pixels. A pixel signal is outputted from each of the plural pixels according to imaging of the subject. The driver 612 amplifies the pixel signal from the imaging element 611 and performs drive (for example, a shutter process) of the imaging element 611. The ADC 613 converts the analog pixel signal received from the driver 612 into a digital signal.

The camera 61 further includes a control unit 614. The control unit 614 converts a differential control signal (differential signals S1A and S1B) received from the controller 20 into a command data CMD (control command). The control unit 614 controls the imaging unit 610 or the auxiliary unit 61A (at least one of the lens unit 62 and the illumination unit 63) according to contents of the command data CMD. When the control unit 614 controls the lens unit 62 or the illumination unit 63, the control unit 614 generates an instruction signal CMD1 according to the command data CMD, and outputs the instruction signal CMD1. The control unit 614 converts image information IMG obtained by the imaging unit 610 into the differential image signal (differential signal S2A and S2B) to output to the outside.

The control unit 614 includes a decoder unit, an encoder unit, a CPU, and the like. The decoder unit converts the image information into differential signals S2A and S2B, the encoder unit converts the differential signals S1A and S1B into command data CMD, and the CPU switches the processes according to the command data CMD.

Thus, the control unit 614 converts the image information IMG into the differential signals S2A and S2B to transmit to the controller 20. The control unit 614 receives the control signal (differential signals S1A and S1B) for controlling the lens unit 62, and controls at least one of the zoom function, the focal distance conversion function, and the aperture function which are possessed by the lens unit 62. In a case where the control signal is a signal for controlling the illumination unit 63A, the control unit 614 receives the differential signals S1A and S1B to control the illumination unit 63. According to the present embodiment, because the lens unit 62 and the illumination unit 63 are remotely controlled from the controller 20, only the signal cable 81 is required as the signal cable connected between the imaging device 60 and the controller 20. Therefore, compact wiring can be realized between the controller 20 and the imaging device 60.

The auxiliary unit 61A includes a motion control unit 90, in addition to the lens unit 62 and illumination unit 63 shown in FIG. 2. The motion control unit 90 is commonly used for the lens unit 62 and the illumination unit 63. Therefore, in FIG. 4, the motion control unit 90 is shown so as to be included in both the lens unit 62 and the illumination unit 63.

The lens unit 62 includes an aperture 622, a motor 623, and a lens 624. The aperture 622 changes an aperture diameter using the motor 623. The lens 624 changes a zoom magnification or a focus using the motor 623. Therefore, the zoom function, the focal distance conversion function, and the aperture function can be realized.

The illumination unit 63 includes an illumination drive unit 631 and an illuminator 632. For example, the illuminator 632 may be a luminous element such as a LED (Light Emitting Diode) and a fluorescent lamp. For example, the illumination drive unit 631 may be a circuit for applying a drive current to the LED or a lighting circuit of the fluorescent lamp.

The motion control unit 90 controls motion of the motor 623 or the illumination drive unit 631 according to the instruction signal CMD1. Therefore, each motion of the aperture 622, the lens 624, and the illuminator 632 is controlled.

The process performed on the side of the controller 20 will be described below. The CPU 24 transmits a command data CMD to the camera I/F 21 through an internal bus 29. The CPU 24 also receives the image information IMG from the camera I/F 21 through the internal bus 29. The camera I/F 21 converts the command data CMD into the differential signals S1A and S1B to transmit the differential signals S1A and S1B. The camera I/F 21 also converts the differential signals S2A and S2B into the image information IMG.

For the sake of convenience in explanation, in relation to the controller 20, only the camera I/F 21, the CPU 24, and the internal bus 29 are shown in FIG. 4, while the portion which is not shown in FIG. 4 has the same configuration as that of FIG. 3.

The signal cable 81 includes signal line pairs 83 and 84. The differential signal S2A and S2B are transmitted from the control unit 614 to the controller 20 through the signal line pair 83. The differential signal SIA and SIB are transmitted from the controller 20 to the control unit 614 through the signal line pair 84. The signal cable 81 is pursuant to the camera link standard.

The signal cable pursuant to the camera link standard includes 13 signal line pairs. In the 13 signal line pairs, four signal line pairs are allocated for transmission of image data, and one signal line pair is allocated for transmission of a clock signal. In the present embodiment, the differential signals S1A and S1B are transmitted using one signal line pair out of the residual eight signal line pairs.

The lens unit 62 and the imaging unit 610 are accommodated the different casings from each other. Similarly the illumination unit 63 and the imaging unit 610 are accommodated in different casings from each other. In other words, the auxiliary unit 61A is detachably attached to the camera 61.

Figure 5:
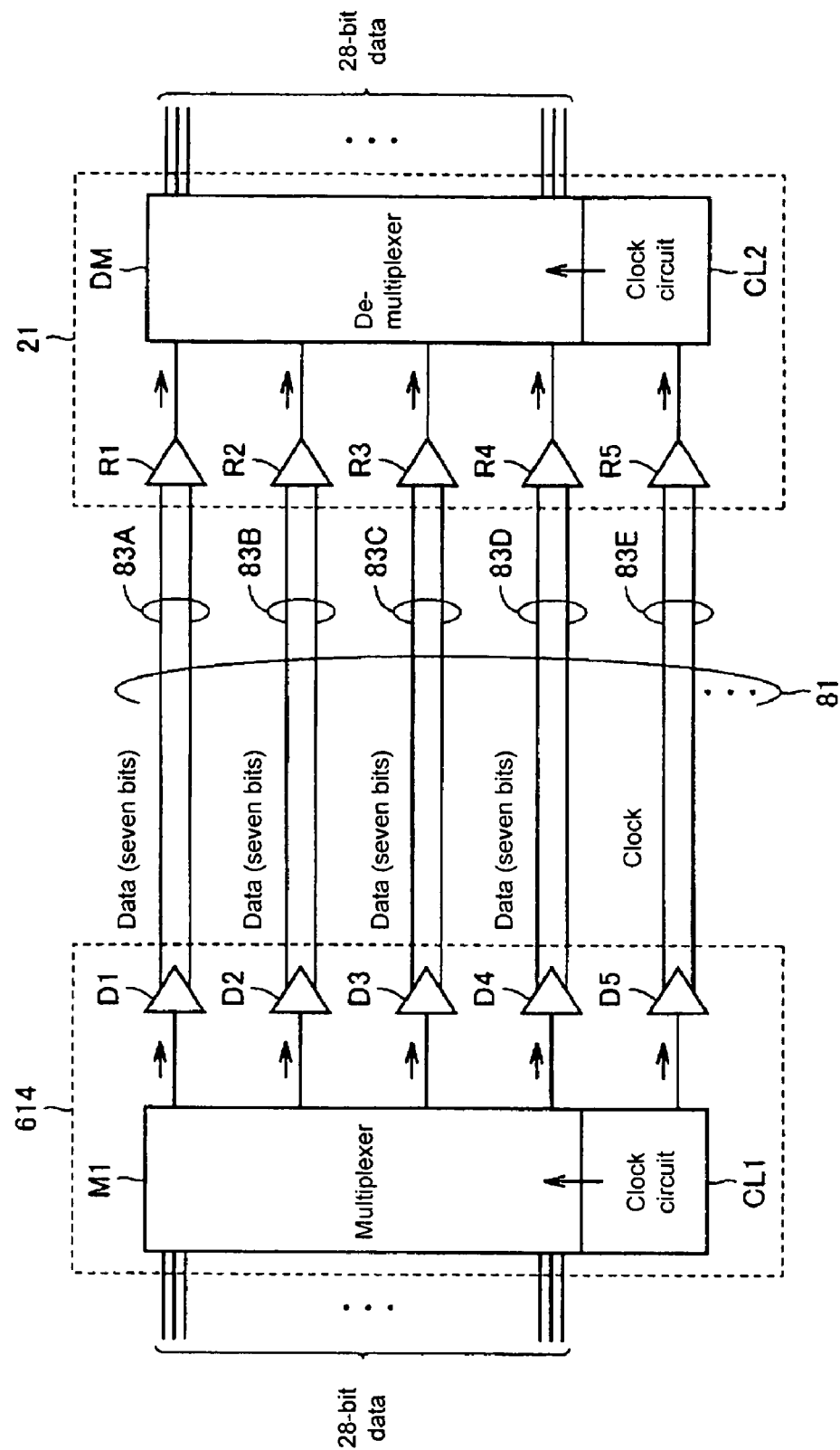
FIG. 5 shows a hardware configuration for transferring image data pursuant to a camera link standard.

FIG. 5 shows a hardware configuration for transferring image data pursuant to the camera link standard.

Referring to FIG. 5, the control unit 614 includes a multiplexer M1, a clock circuit CL1, and drivers D1 to D5. The camera I/F 21 includes receivers R1 to R5, a de-multiplexer DM, and a clock circuit CL2. The signal cable 81 includes signal line pairs 83A to 83E. That is, the signal line pairs 83A to 83E are provided correspondingly to the drivers D1 to D5 respectively, and the receivers R1 to R5 are provided correspondingly to the drivers D1 to D5 respectively.

In the regulation of the camera link standard, image data is transmitted from the camera through a LVDS (low-voltage differential signal) channel. In the LVDS method, because one piece of data (one bit) is differential-transmitted through one signal line pair, there is an advantage that the data is hardly affected by a noise.

In the camera link standard, 28-bit parallel data is transmitted using four LVDS channels. In accordance with the clock signal from the clock circuit CL1, the multiplexer M1 divides image information (28-bit data) transmitted from the ADC 613 of FIG. 4 to output to the drivers D1 to D4. Each of the drivers D1 to D4 converts the received data signal into the differential signal to output the differential signal. Seven-bit data signal is serial-transmitted through each of the signal line pairs 83A to 83D.

Thus, in the camera link standard, data transfer of an RGB 24-bit color image or a 12-bit monochrome image can be realized through the four signal line pairs. Accordingly, when compared with the conventional standard such as RS-644, the number of signal lines included in the signal cable can be decreased in the camera link standard.

The receivers R1 to R4 receive 7-bit signals respectively transmitted from the drivers D1 to D4 to convert into single-end signals. The de-multiplexer DM outputs data outputted from the receiver R1 to R4 in the form of 28-bit parallel data according to the clock signal from the clock circuit CL2. The clock signal is transmitted from the clock circuit CL1 to the clock circuit CL2 in order to synchronize the clock signal between the clock circuits CL1 and CL2.

Figure 6:
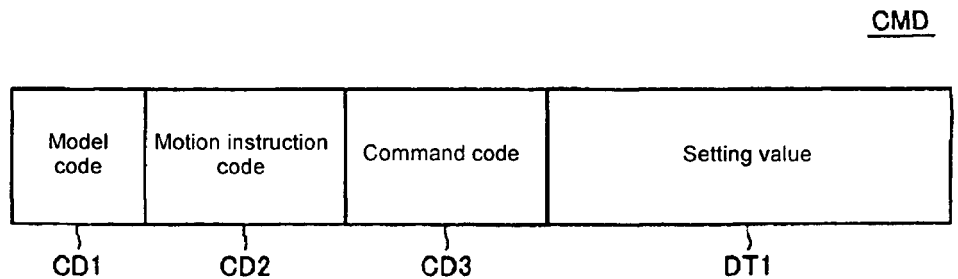
FIG. 6 shows a configuration of a command data CMD of FIG. 4.

FIG. 6 shows a configuration of the command data CMD of FIG. 4. Referring to FIG. 6, command data CMD includes a model code CD1, a motion instruction code CD2, a command code CD3, and a setting value DT1.

For example, the model code CD1 is a numerical value such as 0, 1, and 2. In a case where the model code CD1 has a value of "0", the command data CMD of FIG. 6 is used to control the camera 61. In a case where the model code CD1 has a value of "1" or "2", the command data CMD is used to control the lens unit 62 and the illumination unit 63 respectively. In this case, the control unit 614 generates and outputs an instruction signal CMD1 according to the command data CMD.

The motion instruction code CD2 has a value of either "0" or "1". In a case where the motion instruction code CD2 has a value of "0", the control unit 614 immediately starts a process according to reception of the command data. On the other hand, in a case where the motion instruction code CD2 has a value of "1", the control unit 614 becomes a standby state until receiving a next command data.

The command code CD3 indicates control performed by the control unit 614 or the motion control unit 90. In controlling the imaging unit 610, for example, the shutter speed is changed. In controlling the lens unit 62, for example, focus adjustment, change in zoom magnification, change in the aperture diameter and the like are performed. In controlling the illumination unit 63, for example, lighting, turn-out, and change in light quantity of the illuminator 632 are performed.

A setting value DT1 indicates a specific numerical value (parameter) of various motions set by the command code CD3.

Figure 7:
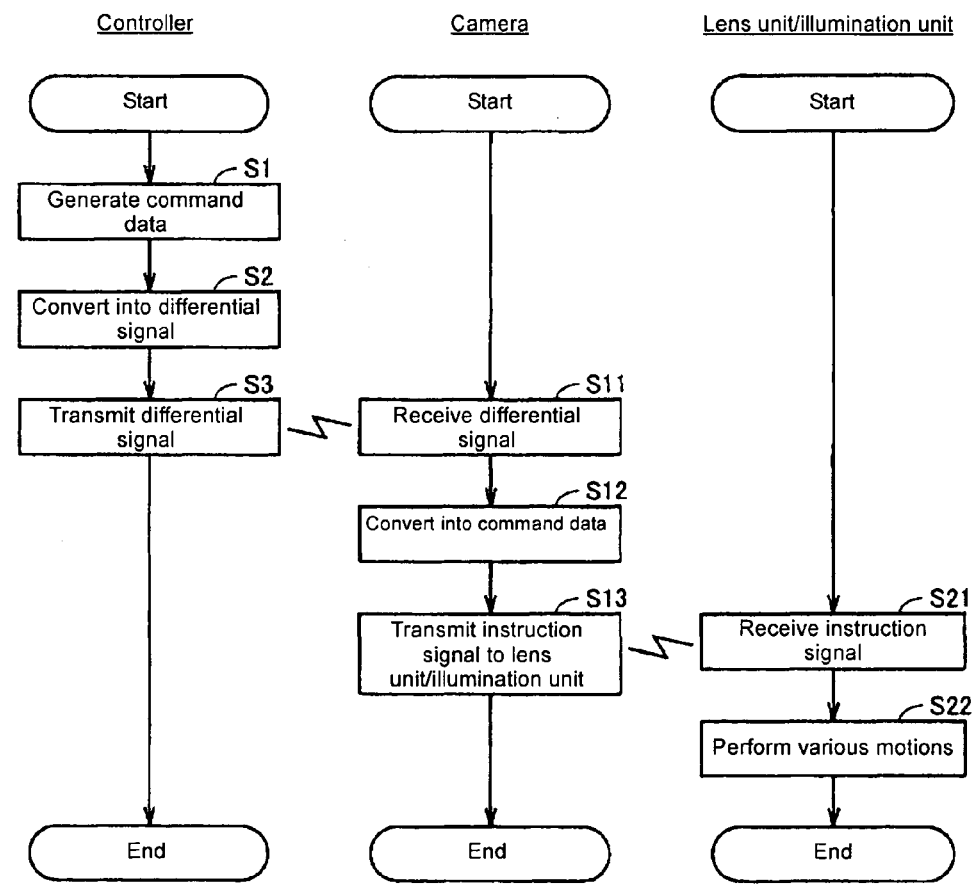
FIG. 7 shows a flowchart explaining a process of controlling a lens unit 62 and an illumination unit 63.

FIG. 7 shows a flowchart explaining a process of controlling the lens unit 62 and the illumination unit 63.

Referring to FIG. 7, in Step S1, the CPU 24 of the controller 20 generates the command data CMD. In Step S2, the camera I/F 21 converts the command data CMD received from the CPU 24 into the differential signals S1A and S1B. In Step S3, the camera I/F 21 transmits the differential signals S1A and S1B to the control unit 614. The controller 20 ends the process by transmitting the differential signals S1A and S1B.

Then, a process performed by the camera 61 will be described. When the process is started, the control unit 614 receives the differential signal (differential signals S1A and S1B) in Step S11. In Step S12, the control unit 614 converts the differential signal into the command data. Based on the model code CD1 of FIG. 6, the control unit 614 judges whether post-conversion command data indicates control to the imaging unit 610 or control to the lens unit 62 (or the illumination unit 63). In this case, because the post-conversion command data indicates control to the lens unit 62 or the illumination unit 63, the control unit 614 transmits the instruction signal CMD1 to the motion control unit 90 of FIG. 4. The camera 61 (control unit 614) ends the process by transmitting the instruction signal CMD1.

Then, processes performed by the lens unit 62 and the illumination unit 63 (i.e., auxiliary unit 61A) will be described. When the process is started, the motion control unit 90 receives the instruction signal CMD1 in Step S21. In Step S22, the motion control unit 90 controls the lens unit 62 or the illumination unit 63 based on the instruction signal CMD1. The lens unit 62 or the illumination unit 63 performs various motions. Thus, the controller 20 remotely controls the lens unit 62 or the illumination unit 63.

Figure 8:
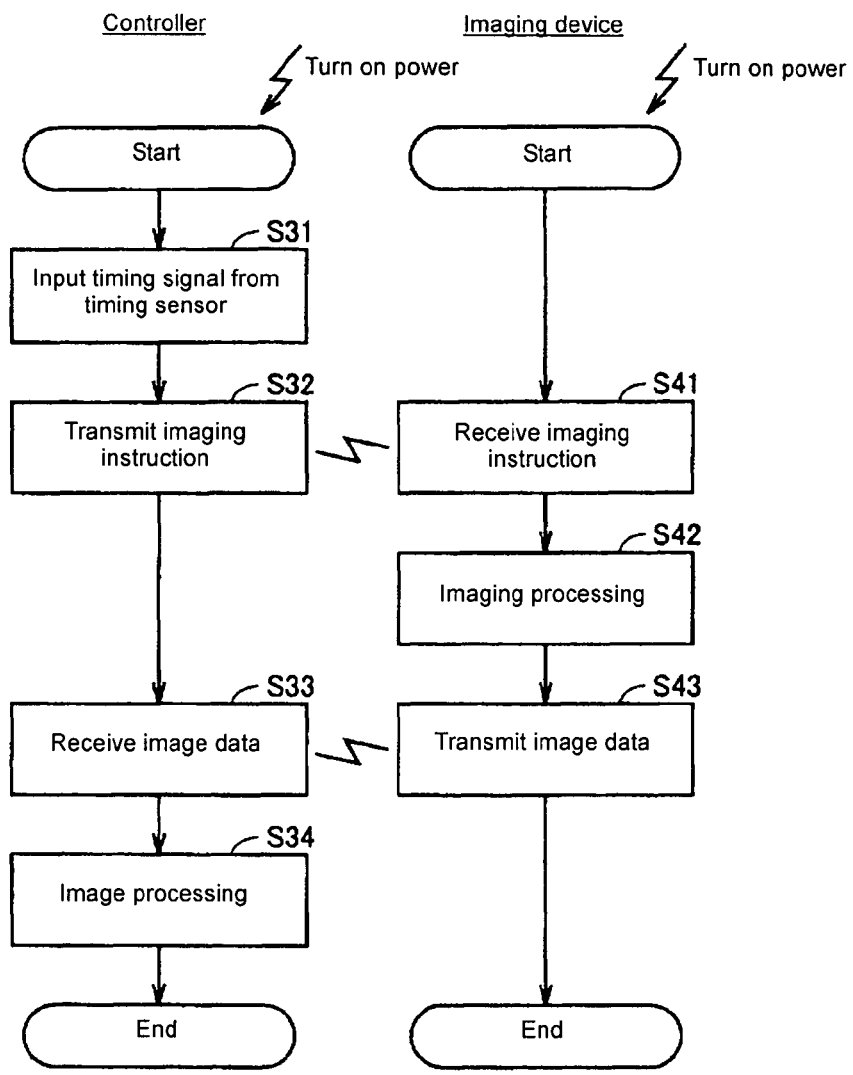
FIG. 8 shows a flowchart explaining image processing performed by the image processing apparatus of the present embodiment.

FIG. 8 shows a flowchart explaining image processing performed by the image processing apparatus of the present embodiment.

Referring to FIG. 8, both the controller 20 and the imaging device 60 of FIG. 2 are turned on according the turn-on of the power.

The controller 20 starts the process according to the turn-on. In Step S31, the timing signal is inputted from the timing sensor 70 of FIG. 3 to the CPU 24. In Step S32, the CPU 24 transmits an imaging instruction to the imaging device 60.

The process is also started on the side of the imaging device 60 according to the turn-on. In Step S41, the control unit 614 receives the imaging instruction from the CPU 24. In Step S42, the control unit 614 controls the imaging unit 610 to cause the imaging unit 610 to take an image of a product (subject) on the production line. In Step S43, the control unit 614 transmits to the controller 20 the image data (image information IMG) received from the imaging unit 610. When the process in Step 43 ends, the imaging device 60 completes the process.

The process performed by the controller 20 will be described again. In Step S33, the CPU 24 receives the image data through the camera I/F 21. In Step S34, the CPU 24 performs image processing (a predetermined process). When the process in Step 34 ends, the controller 20 completes the series of processes.

Figure 9:
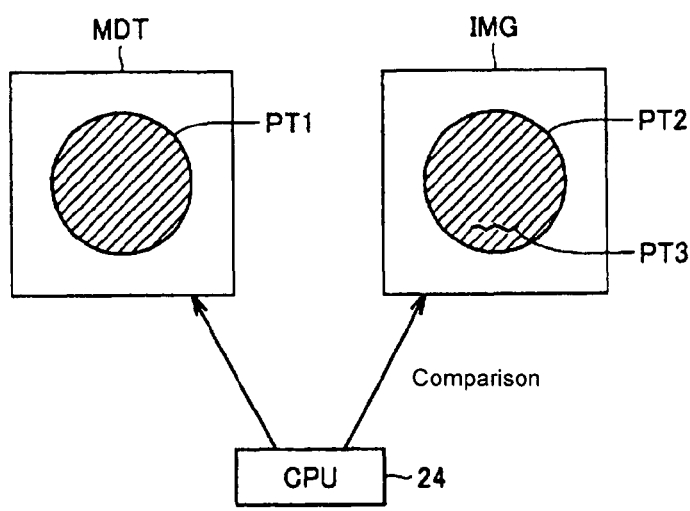
FIG. 9 schematically shows image processing in Step S34 of FIG. 8.

FIG. 9 schematically shows the image processing in Step S34 of FIG. 8. Referring to FIG. 9, image information MDT is previously stored in the RAM 22 of FIG. 3. An image pattern PT1 is included in the image information. The CPU 24 compares the image information IMG obtained from the imaging device 60 to the image information MDT. An image pattern PT2 is included in the image information IMG. In FIG. 9, the image pattern PT2 includes an image pattern PT3 caused by a flaw or dirt of the product. When no image pattern PT3 exists, the CPU 24 judges that the image pattern PT2 matches the image pattern PT1. However, in the example of FIG. 9, the CPU 24 judges that the image pattern PT2 does not match the image pattern PT1. The image processing in Step S34 is not limited to the example of FIG. 9. For example, contrast or an outline of the taken image may be corrected in the image processing.

As described above, according to the present embodiment, remote control by the controller can be realized to the lens and the illumination included in the imaging device using compact wiring.

The disclosed embodiment is described only by way of example, and it is understood that the invention is not limited thereto. The scope of the invention is shown not by the above description but by claims, and any changes and modifications could be made without departing from the scope of the claims.

What is claimed is:

1. An image processing apparatus comprising:
    an imaging device including an illumination unit, an imaging unit for taking an image of a subject, and a control unit for controlling the illumination unit, and converting image information obtained by the imaging unit into a differential image signal to output the differential image signal;

the image processing apparatus further comprising:
    a main body unit for receiving the differential image signal from the control unit to perform a predetermined process, and converting a control command for controlling the illumination unit or the imaging unit into a differential control signal to output the differential control signal; and
    a single signal cable for transmitting the differential image signal and the differential control signal, wherein
    the signal cable includes:
    a signal line pair for transmitting the differential image signal from the control unit to the main body unit; and
    a signal line pair for transmitting the differential control signal from the main body unit to the control unit,
    wherein
    the illumination unit and the imaging unit are accommodated in different casings from each other;
    the control unit converts the differential control signal back into the control command, controls the imaging unit based on the control command when the control command indicates control to the imaging unit, and generates an instruction signal according to the control command to transmit to the illumination unit when the control command indicates control to the illumination unit;
    the illumination unit includes a motion control unit for controlling motion of the illumination unit according to the instruction signal;
    the illumination unit and the control unit are connected via a second signal cable or are directly connected via connectors; and
    the instruction signal outputted from the control unit and to be transmitted to the illumination unit is transmitted to the motion control unit of the illumination unit through the second signal cable or the connectors.

2. An image processing apparatus according to claim 1, wherein
    the imaging device further includes a lens unit having at least one of a zoom function, a focal distance conversion function, and an aperture function;
    the imaging unit takes the image of the subject through the lens unit;
    the control unit further receives a differential control signal for controlling the lens unit, controls at least the one of the zoom function, the focal distance conversion function, and the aperture function which are possessed by the lens unit, and converts the image information obtained by the imaging unit into the differential image signal to output the differential image signal; and
    the main body unit of the image processing apparatus converts a control command for controlling the lens unit into the differential control signal to output the differential control signal.

3. An image processing apparatus according to claim 2, wherein
    the lens unit and the imaging unit are accommodated in different casings from each other;
    the control unit converts the differential control signal into the control command, controls the imaging unit based on the control command when the control command indicates control to the imaging unit, and generates an instruction signal according to the control command to transmit to the lens unit when the control command indicates control to the lens unit; and
    the lens unit includes a motion control unit for controlling motion of the lens unit according to the instruction signal, wherein the lens unit and the control unit are connected via the second signal cable or are directly connected via connectors; and the instruction signal outputted from the control unit and to be transmitted to the lens unit is transmitted to the motion control unit of the lens unit through the second signal cable or the connectors.

4. An image processing apparatus according to claim 1, wherein the signal cable is pursuant to a camera link standard.

5. An image processing apparatus according to claim 2, wherein the lens unit and the illumination unit are housed in an auxiliary unit and are accommodated in different casings, the auxiliary unit is detachably attached to the imaging unit; and the motion control unit is included in the auxiliary unit and is commonly used for controlling the lens unit and the illumination unit.

* * * * *